(12) United States Patent
Soliman et al.

(10) Patent No.: US 10,435,023 B2
(45) Date of Patent: Oct. 8, 2019

(54) PREDICTIVE POWERTRAIN LIMITS STRATEGY FOR AUTONOMOUS/AUTOMATED DRIVING VEHICLE

(71) Applicant: Continental Automotive Systems, Inc., Auburn Hills, MI (US)

(72) Inventors: Ihab Soliman, Washington, MI (US); Brian McKay, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 93 days.

(21) Appl. No.: 15/463,350

(22) Filed: Mar. 20, 2017

(65) Prior Publication Data

US 2018/0170382 A1 Jun. 21, 2018

Related U.S. Application Data

(60) Provisional application No. 62/436,050, filed on Dec. 19, 2016.

(51) Int. Cl.
*B60W 30/14* (2006.01)
*B60L 58/13* (2019.01)
(Continued)

(52) U.S. Cl.
CPC ............. *B60W 30/146* (2013.01); *B60K 1/00* (2013.01); *B60K 31/04* (2013.01);
(Continued)

(58) Field of Classification Search
CPC ............... B60W 30/146; B60W 30/14; B60W 50/0097; B60W 2510/244;
(Continued)

(56) References Cited

U.S. PATENT DOCUMENTS

| 2002/0082764 A1* | 6/2002 | Ikeda | B60K 31/04 701/95 |
|---|---|---|---|
| 2017/0160745 A1* | 6/2017 | Lauffer | G01S 13/931 |
| 2018/0105158 A1* | 4/2018 | Namuduri | B60W 20/12 |

FOREIGN PATENT DOCUMENTS

| JP | 2002192979 A | 7/2002 |
|---|---|---|
| JP | 2008024010 A | 7/2008 |

(Continued)

OTHER PUBLICATIONS

Office Action dated Sep. 10, 2018 from corresponding Japanese App. No. 2017-241858.

*Primary Examiner* — Courtney D Heinle

(57) ABSTRACT

An expanded powertrain interface and strategy for an autonomous driving controller to control powertrain torque (or vehicle acceleration/deceleration) capability at the current operating point, in addition to capability for subsequent operating points at a future time based on predictive assessment of powertrain energy management, subsystem contraints/limits, and capability in the future. The powertrain interface and strategy applies to a vehicle with electrified powertrain control (hybrid electric vehicle (HEV) or pure battery electric vehicle (BEV)) with an autonomous driving (AD) capability (either full or semi-automated driving). This powertrain interface and strategy may also be used with non-electrified powertrain (conventional) systems based on available combustion engine torque at the target vehicle speed and gear.

14 Claims, 7 Drawing Sheets

(51) Int. Cl.
 *B60K 1/00* (2006.01)
 *B60K 31/04* (2006.01)
 *B60L 15/20* (2006.01)
 *B60W 50/00* (2006.01)
 *B60K 31/00* (2006.01)

(52) U.S. Cl.
 CPC .......... *B60L 15/2045* (2013.01); *B60L 58/13* (2019.02); *B60W 30/14* (2013.01); *B60W 50/0097* (2013.01); *B60K 2031/0091* (2013.01); *B60L 2240/12* (2013.01); *B60L 2240/14* (2013.01); *B60L 2240/421* (2013.01); *B60L 2260/32* (2013.01); *B60W 2510/244* (2013.01); *B60W 2520/10* (2013.01); *B60W 2720/10* (2013.01); *B60W 2720/106* (2013.01); *Y02T 10/7258* (2013.01)

(58) Field of Classification Search
 CPC ......... B60W 2520/10; B60W 2720/10; B60W 2720/106; B60K 1/00; B60K 31/04; B60K 2031/0091; B60L 11/1862; B60L 15/2045; B60L 2240/12; B60L 2240/14; B60L 2240/421; B60L 2260/32; B60L 58/13; Y02T 10/7258
 See application file for complete search history.

(56) References Cited

FOREIGN PATENT DOCUMENTS

| | | | |
|---|---|---|---|
| JP | 2009241827 | A | 10/2009 |
| JP | 2011239605 | A | 11/2011 |
| JP | 2014222988 | A | 11/2014 |

\* cited by examiner

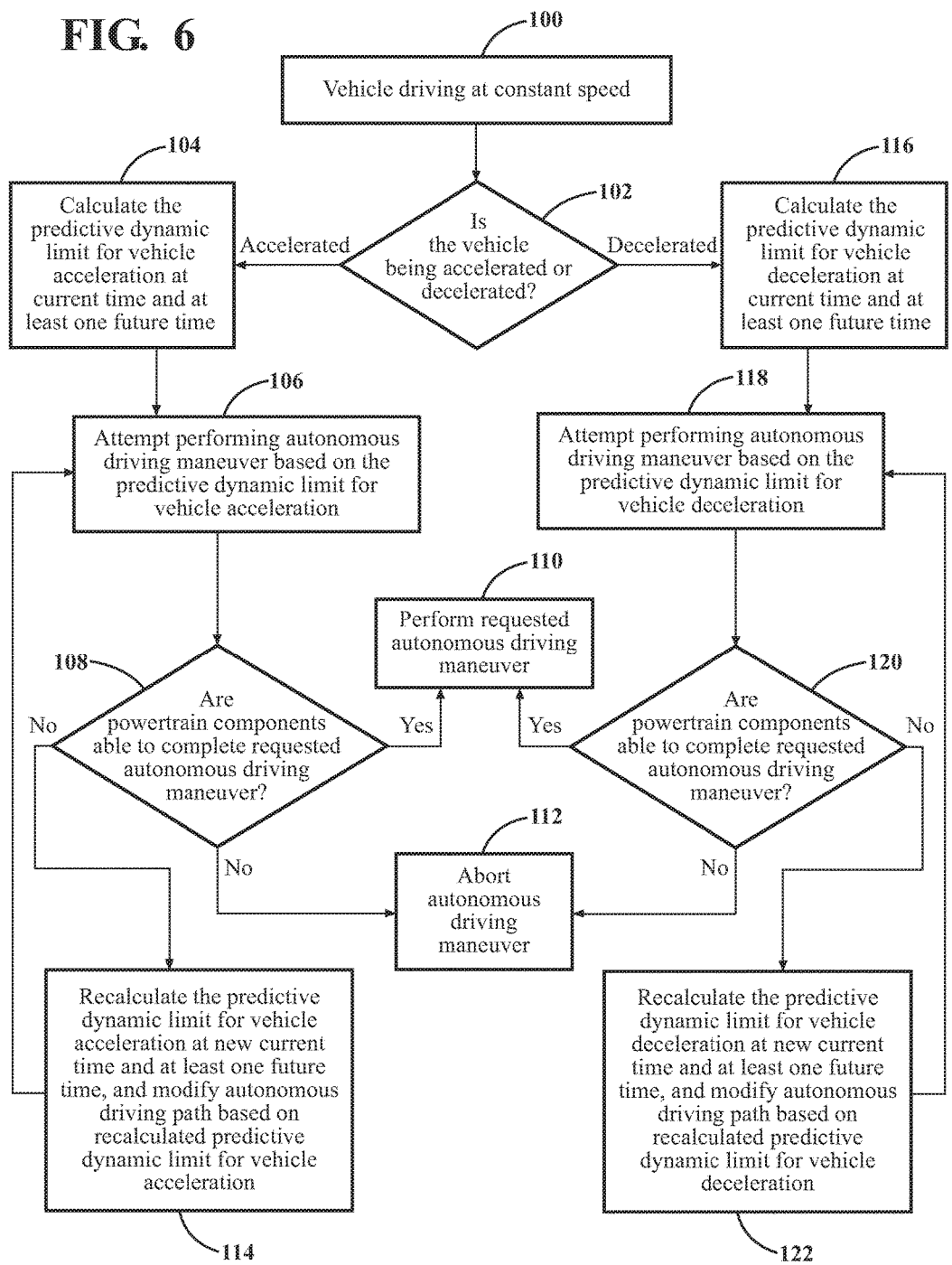

PREDICTIVE POWERTRAIN LIMITS STRATEGY FOR AUTONOMOUS/AUTOMATED DRIVING VEHICLE

CROSS-REFERENCE TO RELATED APPLICATIONS

This application claims the benefit of U.S. Provisional Application No. 62/436,050 filed Dec. 19, 2016. The disclosure of the above application is incorporated herein by reference.

FIELD OF THE INVENTION

The invention relates generally to an autonomous driving system powertrain interface which is able to modify the driving path of a vehicle based on the current and predicted capability of the powertrain components of the vehicle, as well as provide updated driving capability of the powertrain components based on changes in the capability of the powertrain components.

BACKGROUND OF THE INVENTION

Current autonomous driving path planning interface between an autonomous driver controller and a powertrain controller is a simple powertrain torque (or vehicle longitudinal acceleration/deceleration request) at a current point in time. This is a similar type of interface to the powertrain controller as compared to a cruise control system and may lead to incorrect vehicle path planning if the powertrain is unable to deliver the required torque (or vehicle acceleration/deceleration) such that the vehicle is able to travel the desired autonomous driving path. This is especially important in a vehicle lane change or passing maneuver, where powertrain capability could suddenly change, or saturate, in terms of vehicle acceleration, potentially leading to an unsafe situation as shown in FIG. 1 at time, t1. This situation may occur due to multiple conditions within the powertrain including traction drive operating limits, high voltage power limits, thermal management, etc. Typical autonomous path planning algorithms output a target vehicle acceleration (or wheel torque) request during the autonomous driving maneuver at the current vehicle operating state without future (or predictive) knowledge if the powertrain components would be able to meet the target profile (shown in FIG. 1). If the powertrain components are unable to meet the target vehicle acceleration demand during the autonomous driving maneuver, one existing solution has been to update to a new target path plan as the autonomous driving maneuver is being performed, or deactivate the autonomous driving function, notify the driver, and return control of the vehicle back to the driver during the maneuver. This is not optimal and potentially unsafe when performing an autonomous driving maneuver. One potential negative outcome would be loss of vehicle acceleration during the passing portion of the autonomous driving maneuver (during time t1) while another vehicle is approaching the vehicle performing the autonomous driving maneuver.

Accordingly, there exists a need for a strategy for predicting the capability of various powertrain components, and alter the autonomous driving path of the vehicle based on a change in the capability of the powertrain components, where there is an optimized powertrain control strategy for acceleration/deceleration control of a fully autonomous or semi-autonomous driving vehicle.

SUMMARY OF THE INVENTION

The present invention is an expanded powertrain interface and strategy to supplement the input from an autonomous driving controller for controlling powertrain torque (or vehicle acceleration/deceleration) capability at a current operating point, in addition to capability for the subsequent operating points in the future based on predictive assessment of powertrain energy management, subsystem contraints/limits, and capability in the future. The present invention applies to a vehicle with electric powertrain control (hybrid electric vehicle (HEV) or pure battery electric vehicle (BEV)) with an autonomous driving (AD) capability (either full or semi-automated driving). This concept may be expanded to non-electrified powertrain (conventional) systems based on available combustion engine torque at the target vehicle speed and gear.

In one embodiment, the present invention is an autonomous driving system powertrain interface having an autonomous driving controller operable for configuring a vehicle to perform at least one autonomous driving maneuver, a powertrain controller in electrical communication with the autonomous driving controller, and at least one powertrain component controlled by the powertrain controller. The powertrain controller is operable for calculating the current capability of the powertrain component and the future capability of the powertrain component, and the autonomous driving controller configures the vehicle to perform the autonomous driving maneuver based on the current capability of the powertrain component, and the future capability of the powertrain component.

The autonomous driving system powertrain interface also includes at least one predictive dynamic limit for vehicle acceleration representing the capability of the powertrain component to accelerate the vehicle. The autonomous driving controller configures the vehicle to perform the autonomous driving maneuver using the powertrain component based on the predictive dynamic limit for vehicle acceleration.

In an embodiment, the predictive dynamic limit for vehicle acceleration includes a first plurality of data points representing the capability of the powertrain component to accelerate the vehicle, where at least one of the first plurality of data points represents the capability of the powertrain components at the current time, and another of the plurality of data points represents the capability of the powertrain components at least one future time. The autonomous driving controller configures the vehicle to perform the autonomous driving maneuver using the powertrain component based on the first plurality of data points at both the current time and the future time. The powertrain controller also recalculates the predictive dynamic limit for vehicle acceleration as the vehicle performs the autonomous driving maneuver, such that the predictive dynamic limit for vehicle acceleration may be changed, and the autonomous driving maneuver may be altered as the predictive dynamic limit for vehicle acceleration is changed.

The autonomous driving system powertrain interface of the present invention also includes a predictive dynamic limit for vehicle deceleration, which represents the capability of the powertrain component to decelerate the vehicle, and the autonomous driving controller configures the vehicle to perform the autonomous driving maneuver using the powertrain component based on the predictive dynamic limit for vehicle deceleration.

The dynamic limit for vehicle deceleration includes a second plurality of data points representing the capability of the powertrain component to decelerate the vehicle, and the autonomous driving controller configures the vehicle to perform the autonomous driving maneuver using the powertrain component based on the second plurality of data points at both the current time and the future time. The powertrain controller recalculates the predictive dynamic limit for vehicle deceleration as the vehicle performs the autonomous driving maneuver such that the predictive dynamic limit for vehicle deceleration may be changed, and the autonomous driving maneuver may be altered as the predictive dynamic limit for vehicle deceleration is changed.

One of the features of the autonomous driving system powertrain interface of the present invention is that the autonomous driving maneuver may be altered based on the capability of the powertrain component, if the capability of the powertrain component changes throughout the progression of the autonomous driving maneuver. Additionally, the autonomous driving maneuver may be aborted completely, if the powertrain component does not have the capability to perform the autonomous driving maneuver.

In an embodiment, the powertrain component is at least one drive actuator having a traction drive motoring limit and a traction drive generating limit, and the autonomous driving maneuver is altered based on the traction drive motoring limit and the traction drive generating limit.

In another embodiment, the powertrain component is at least one battery having a maximum charge limit and a maximum discharge limit, and the autonomous driving maneuver is altered based on the maximum charge limit and the maximum discharge limit.

In yet another embodiment, the autonomous driving controller alters the autonomous driving maneuver such that the powertrain component is operated in the most efficient manner.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a flow chart demonstrating the steps performed by an autonomous driving system powertrain interface, according to embodiments of the present invention.

DETAILED DESCRIPTION OF THE PREFERRED EMBODIMENTS

The following description of the preferred embodiment(s) is merely exemplary in nature and is in no way intended to limit the invention, its application, or uses.

The present invention is an autonomous driving system powertrain interface which is able to modify the driving path of a vehicle based on the current and predicted driving capability of the powertrain components of the vehicle, as well as provide updated driving capability based on changes in the capability of the powertrain, or changes in the environment outside the vehicle, such as road grade, vehicle environment, road surface condition, traffic flow or traffic timing information.

Figure 1:
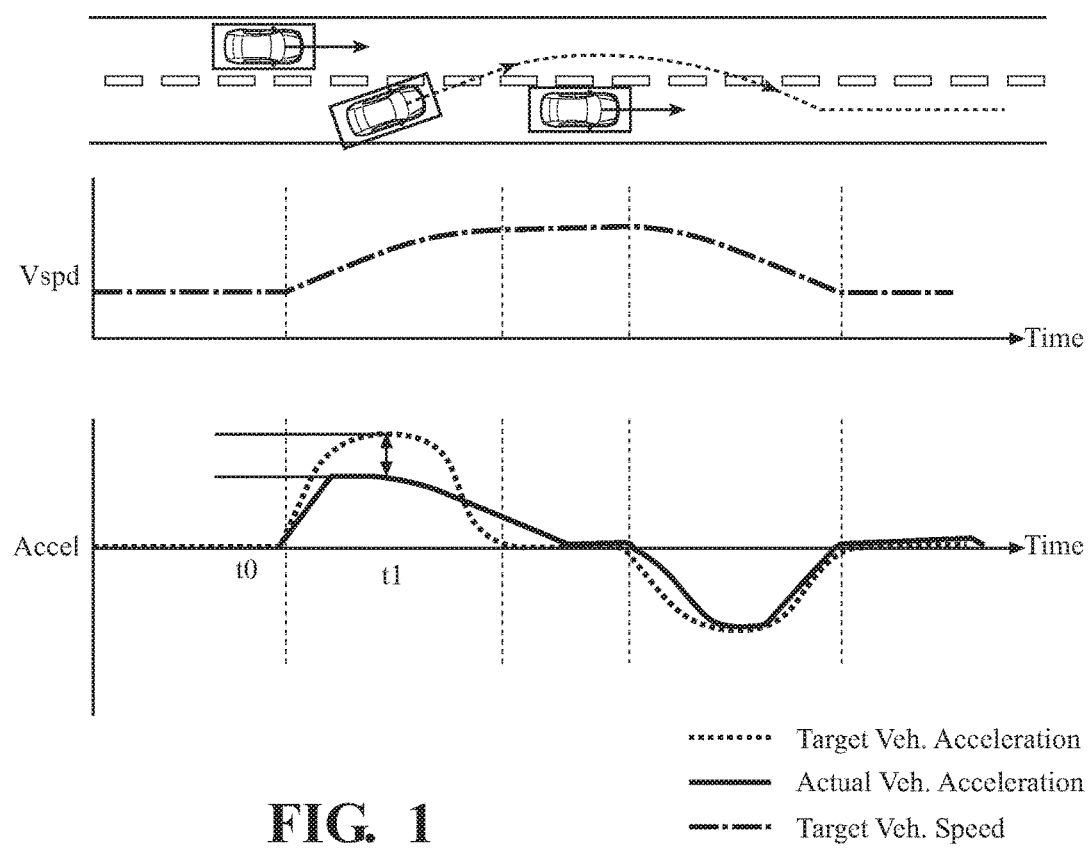
FIG. 1 is a diagram of an autonomous driving path and operating characteristics for one vehicle passing another, where the powertrain components of the vehicle do not have the capability for the vehicle to complete the maneuver.
Figure 2:
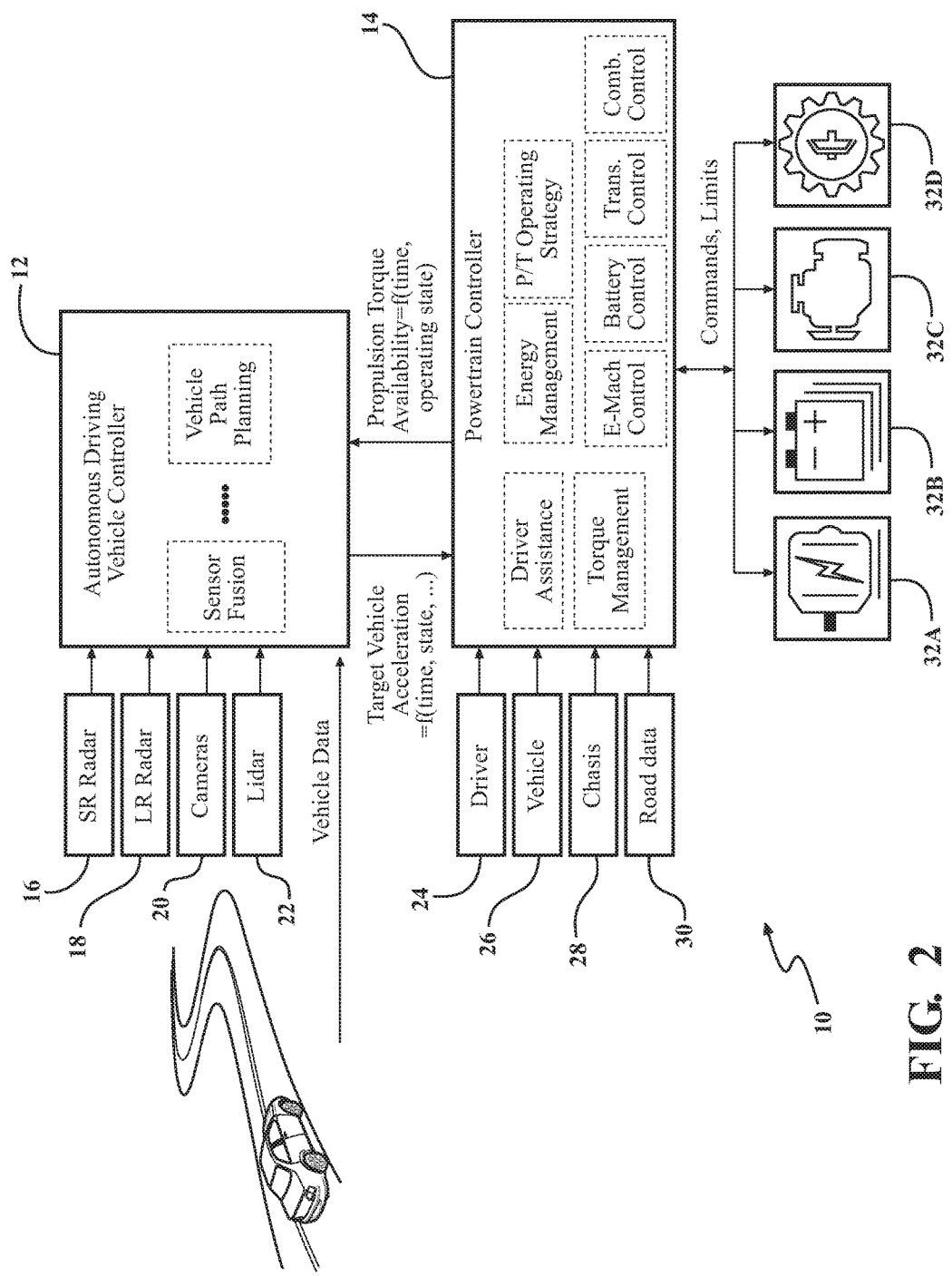
FIG. 2 is a diagram of a system of an autonomous driving system powertrain interface, according to embodiments of the present invention.

An autonomous driving system for a vehicle having an embodiment of an autonomous driving system powertrain interface is shown in FIG. 2, generally at 10. The system 10 includes an autonomous driving vehicle controller 12 in electrical communication with a powertrain controller 14. The autonomous driving vehicle controller 12 receives input from various devices, such as short range (SR) Radar 16, long range (LR) Radar 18, cameras 20, and lidar 22, such that various autonomous driving maneuvers may be performed by the vehicle. The data received by the autonomous driving vehicle controller 12 from each of these devices is used to develop a plan for a vehicle path, where one or more autonomous driving maneuvers are performed such that the vehicle travels the vehicle path. The powertrain controller 14 receives input from the vehicle driver 24, different types of vehicle input 26 (such as, but not limited to, vehicle speed, temperature, barometric pressure, and any other type of desired input from the vehicle), chassis 28, and various road data 30, and uses this information for energy management and to provide an operating strategy of the various powertrain components 32A-32D, such as at least one actuator, which in this embodiment is a traction drive motor 32A, a battery 32B, an engine 32C, and a driveline component 32D. The driveline component 32D may be any component in the driveline of the vehicle, such as a gear box or power split device.

The capability of the powertrain components 32A-32D of the vehicle in the future (such as when the vehicle is travelling) is dependent on multiple factors including, but not limited to, traction drive limits (peak/continuous), battery system limits/state-of-charge (including a maximum charge limit and maximum discharge limit), thermal management, powertrain operating state, etc. The autonomous driving system 10 of the present invention expands the interface between the powertrain system of the vehicle and the autonomous driving controller 12, such that data received by both the autonomous driving vehicle controller 12 and the powertrain controller 14 may be used to provide for a more accurate planning of the path of the vehicle, and potentially alters the path of the vehicle based on the capability of the powertrain components 32A-32D at both a current operating time, in addition to multiple points in time in the future, so that an autonomous driving maneuver may be completed safely and without interruption, or aborted if the powertrain components 32A-32D do not have the required capability such that the vehicle may perform the requested autonomous driving maneuver. This minimizes potential functional safety hazards during an autonomous maneuver due to unexpected loss of longitudinal acceleration or deceleration capability.

The autonomous driving controller 12 may also provide the target vehicle acceleration/deceleration (or wheel torque) at both the current operating condition of the powertrain system and in the future based on a desired autonomous driving path. The powertrain controller 14 uses the information of the desired vehicle path and the capability of the powertrain components 32A-32D to optimize energy management and fuel efficiency, in addition to preparing the powertrain components 32A-32D for upcoming acceleration requirements of the vehicle.

Figure 3:
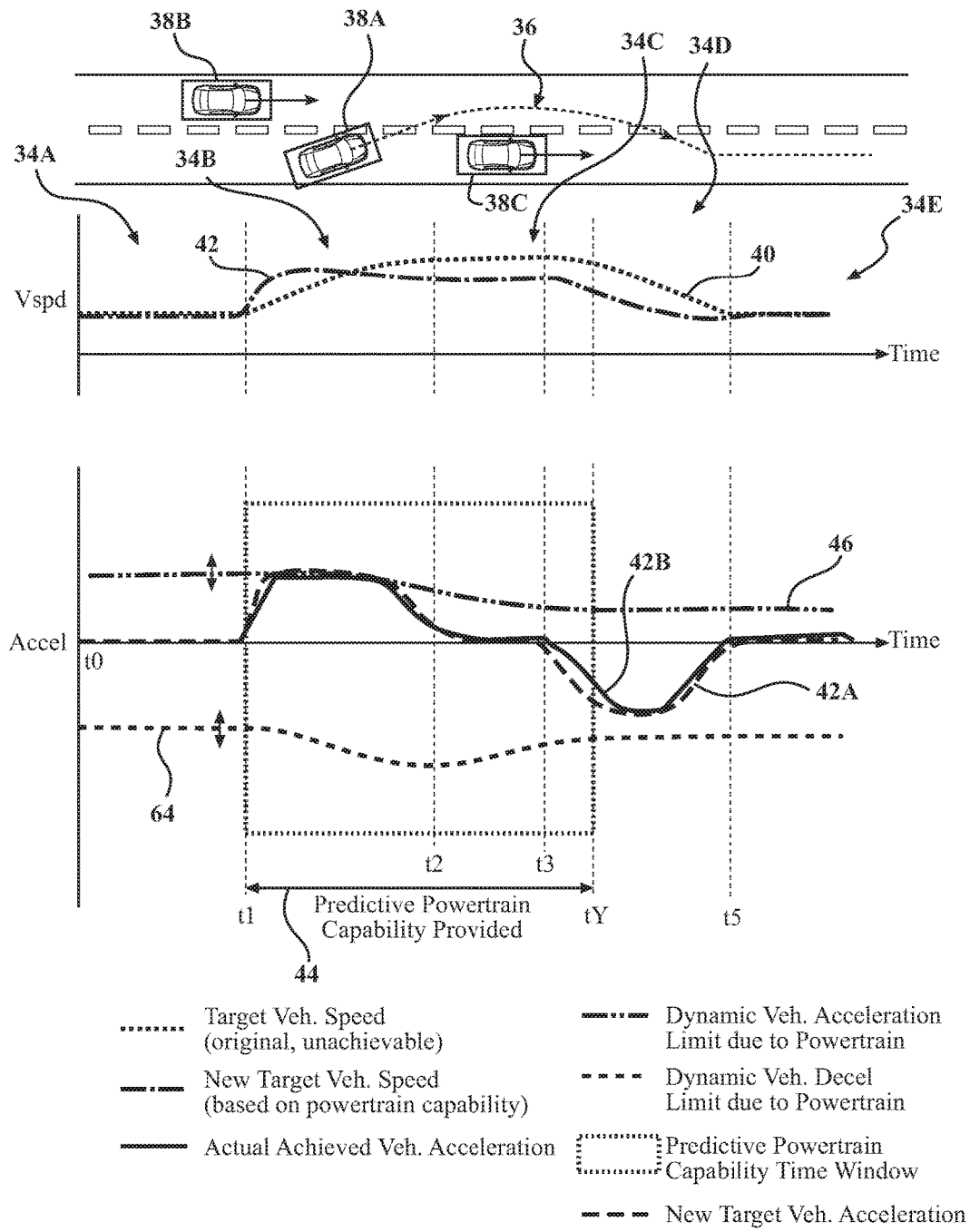
FIG. 3 is a diagram of an autonomous driving path and operating characteristics for one vehicle passing another using an autonomous driving system powertrain interface, where the diagram includes a predictive powertrain capability window, according to embodiments of the present invention.

The various steps described above are part of the planning of an autonomous driving path, and potentially altering the path based on the capability of the powertrain components 32A-32D, an example of which is shown in FIG. 3. FIG. 3 includes five phases, shown generally at 34A-34E, respectively, showing various operating parameters, which are used as part of the autonomous driving system 10 (shown in FIG. 2) to create a desired autonomous driving path, shown generally at 36, of a first vehicle 38A. FIG. 3 also includes two other vehicles 38B, and 38C, where the first vehicle 38A follows the autonomous driving path 36 to perform a passing maneuver to pass the third vehicle 38C prior to the second vehicle 38B encroaching on the first vehicle 38A.

With continued reference to FIGS. 2-3, during the operation of the vehicle 38A in the example shown, the autonomous driving controller 12 commands an original target vehicle speed 40 and a corresponding original target vehicle acceleration required for the first vehicle 38A to perform the aforementioned passing maneuver. However, there may be situations where the vehicle 38A may not be able to perform the passing maneuver due to the limits in the capability of the powertrain components 32A-32D. If the original target vehicle speed 40 is unattainable because of the limits of the powertrain components 32A-32D, the vehicle 38A is then unable reach the original target vehicle acceleration, and therefore is unable travel the desired autonomous driving path 36 to perform the passing maneuver. If the vehicle 38A were to attempt the passing maneuver based on the original target vehicle speed 40 and corresponding acceleration, but is not able to achieve the required speed 40 and corresponding acceleration, the vehicle 38A would be in danger of collision with one of the other vehicles 38B, 38C.

However, the system 10 of the present invention is able to change the operation of the vehicle 38A, such as the speed and acceleration, based on the limits of the powertrain components 32A-32D, or cancel maneuvering along the requested autonomous driving path 36. In the example shown in FIGS. 2-3, the vehicle 38A is travelling at a constant velocity during the first phase 34A, between t0 and t1. The autonomous driving controller 12 requests a new target vehicle speed 42 which includes a corresponding target vehicle acceleration 42A (i.e., acceleration, or wheel torque capability) that is achievable based on the limits of the powertrain components 32A-32D at the start of the maneuver at time t1, and the capabilities of the powertrain components 32A-32D at some point in the future, or a future time, tY. The actual achieved vehicle acceleration is shown at 42B.

Figure 4A:
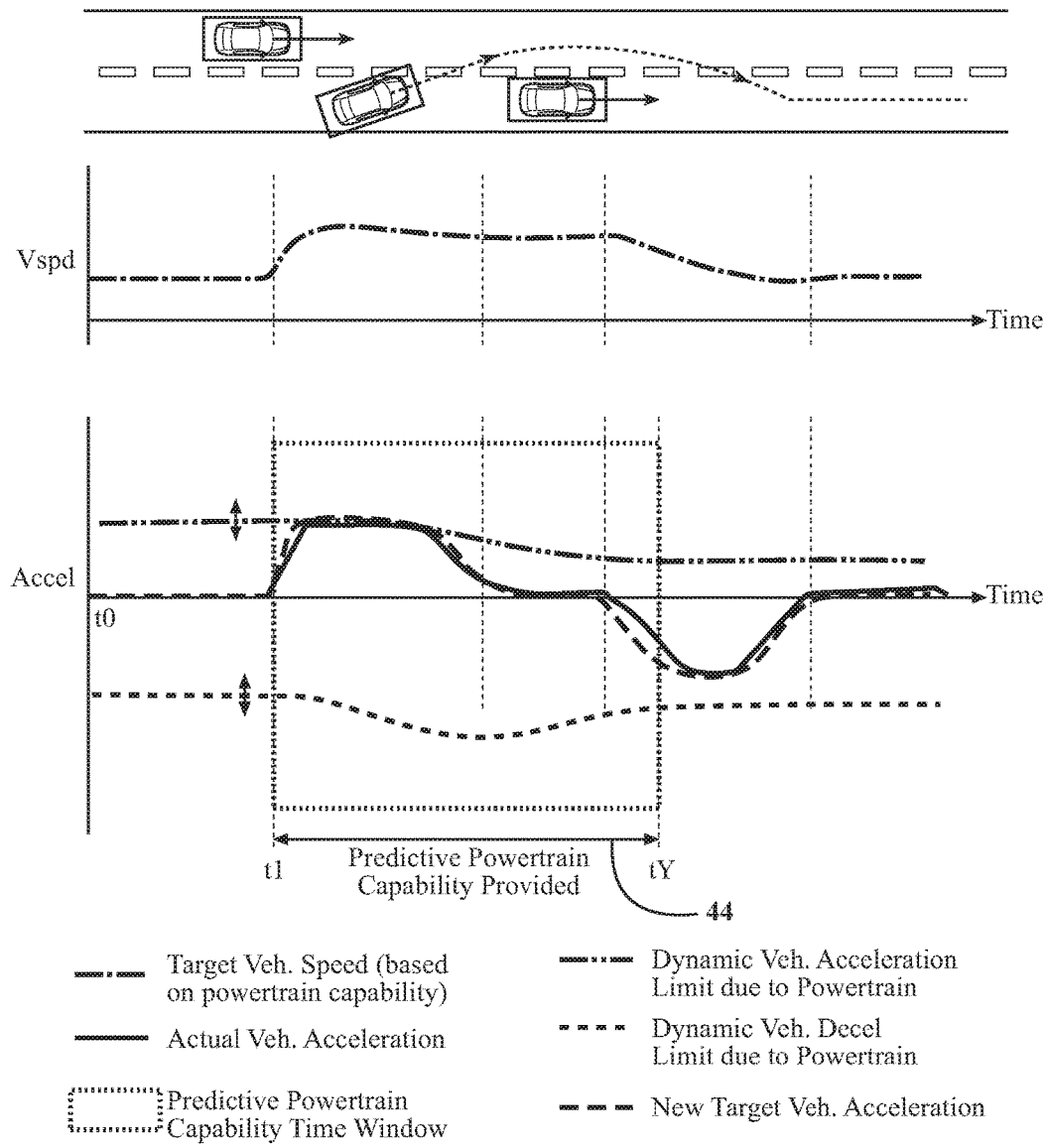
FIG. 4A is a first diagram of an autonomous driving path and operating characteristics for one vehicle passing another using an autonomous driving system powertrain interface, where the diagram includes a predictive powertrain capability window in a first location, which changes over time, according to embodiments of the present invention.
Figure 4B:
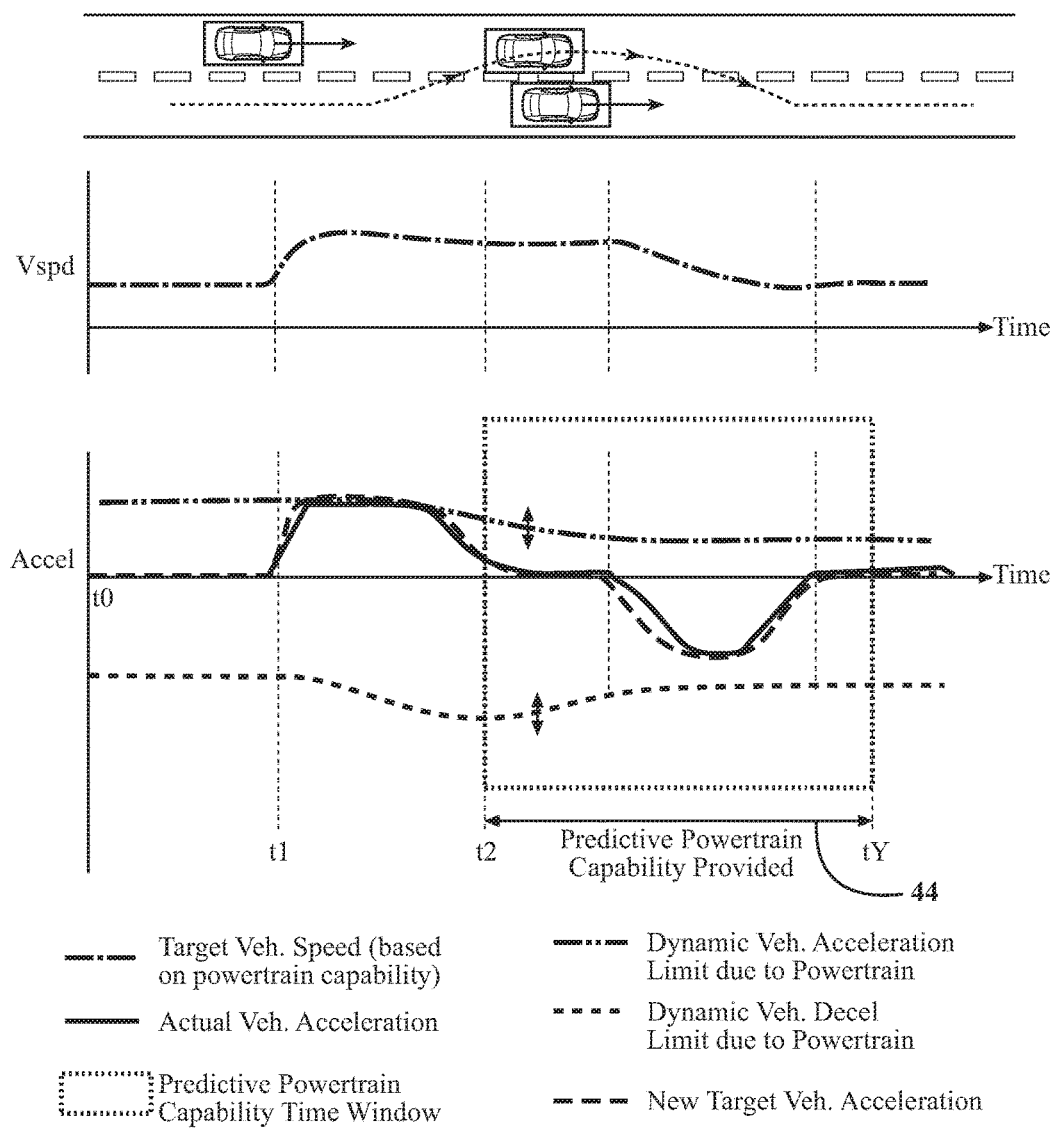
FIG. 4B is a second diagram of an autonomous driving path and operating characteristics for one vehicle passing another using an autonomous driving system powertrain interface, where the diagram includes a predictive powertrain capability window in a second location, which changes over time, according to embodiments of the present invention.

One of the advantages of the system 10 of the present invention is that the new target vehicle speed 42 and acceleration 42A of the vehicle 38A (based on the capability of the powertrain components 32A-32D) may be changed and therefore updated in real time for the current operating time and multiple points in time in the future as the vehicle 38A travels the commanded autonomous driving path 36. The powertrain controller 14 communicates the updated capability of the powertrain components 32A-32D to the autonomous driving vehicle controller 12 not only at the current time t1 at the start of the maneuver, but also for as many data points as required at the future time (i.e., t2, t3, t4 . . . tY). Also shown in FIGS. 4A-4B is a moving window 44, which highlights the current operating characteristics of the components 32A-32D. The moving window 44 changes (i.e., moves from left to right in FIGS. 4A-4B), since dynamically the condition and limits of the powertrain components 32A-32D may change as the vehicle 38A travels the autonomous driving path 36, as shown in FIGS. 4A-4B. This allows the powertrain controller 14 to update what the capability of the powertrain components 32A-32D are going to be in the future to the autonomous driving vehicle controller 12 as the vehicle 38A travels the autonomous driving path 36.

In the example shown, at time t1, the powertrain controller 14 updates what the capability of the powertrain components 32A-32D is going to be in the future to the autonomous driving vehicle controller 12 for the current time t1 and as many data points as desired in the future (i.e., t2, t3, t4 . . . tY). At time t2, the powertrain controller 14 updates what the capability of the powertrain components 32A-32D are going to be in the future to the autonomous driving vehicle controller 12 for the current time t2 and as many data points as required in the future (i.e., t3, t4 . . . tY). The powertrain controller 14 may also update the autonomous driving vehicle controller 12 of the capability of the powertrain components 32A-32D at as many different points in time in the future between t1 and tY. As shown in FIGS. 3-4B, the earlier that the powertrain's predictive vehicle acceleration capability information is provided to the autonomous driving controller 12, the more accurately and quickly the trajectory of the autonomous driving path 36 is updated.

Figure 5:
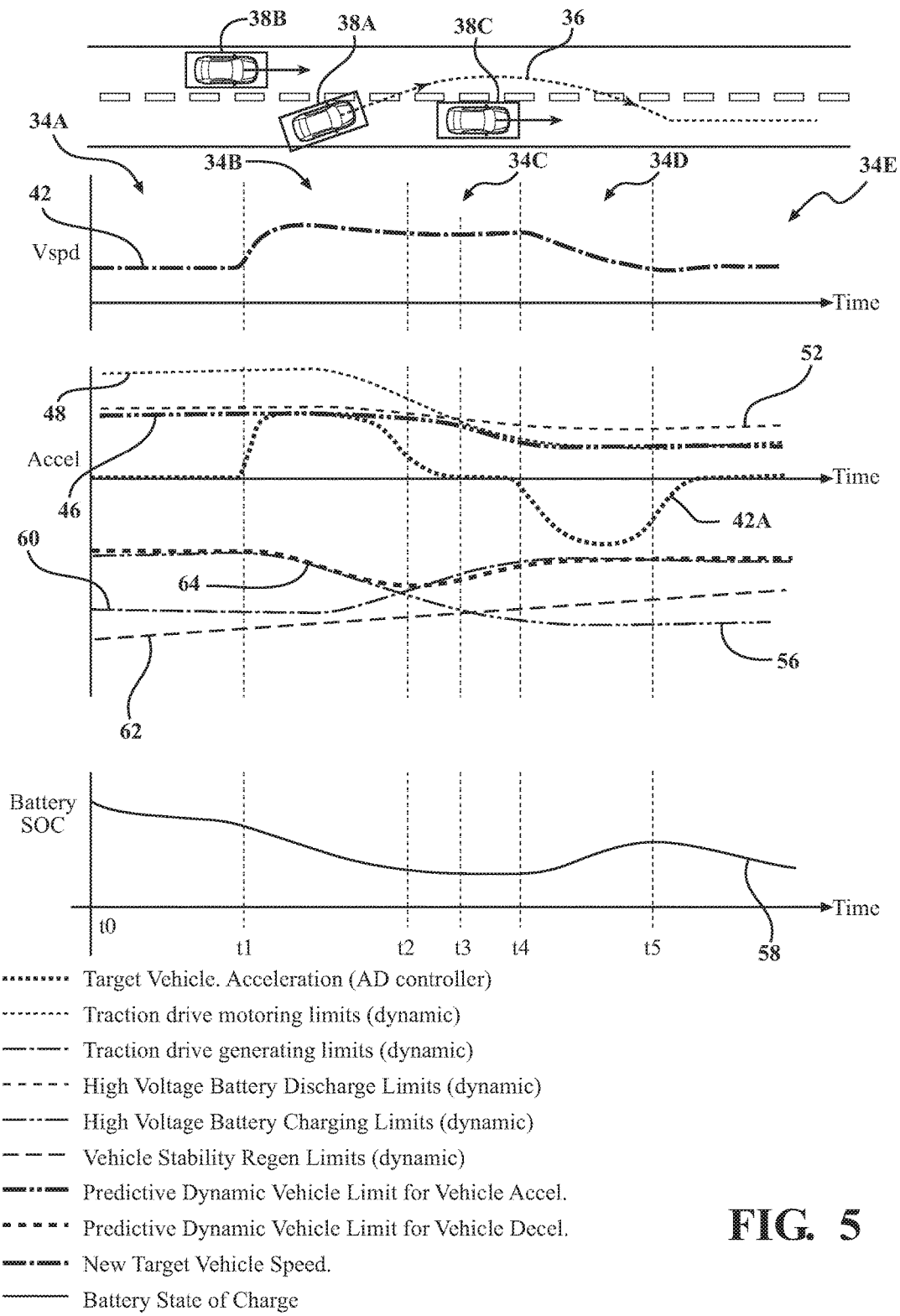
FIG. 5 is a diagram of an autonomous driving path and the predictive vehicle acceleration and deceleration limits of a vehicle powertrain used to maneuver a vehicle along an autonomous driving path, where the vehicle has an autonomous driving system powertrain interface, according to embodiments of the present invention.

The calculation for predictive vehicle acceleration based on the limits of the powertrain components 32A-32D takes into account multiple factors including, but not limited to, traction drive limits (peak/continuous), battery system limits/state-of-charge (SOC), vehicle stability limits, powertrain operating state, etc. Referring to FIGS. 5-6, an example of an autonomous driving maneuver, such as a lane passing maneuver along with the operating characteristics of the vehicle 38A are shown using a predictive vehicle acceleration powertrain limit strategy which adapts and changes the autonomous driving path 36 based on the limits in the capability of the powertrain components 32A-32D.

Referring to FIGS. 3-6, starting at time t0 in the first phase 34A, and at step 100, the vehicle 38A is travelling at a constant speed, and a decision is made as to whether the vehicle 38A is going to be accelerated or decelerated. In this example, the decision is made at step 102 to accelerate the vehicle 38A to perform the passing maneuver. Beginning at time t0 in the first phase 34A, and step 104, the powertrain controller 14 calculates a predictive dynamic limit for vehicle acceleration 46 to accelerate the vehicle 38A, where the predictive dynamic limit for vehicle acceleration 46 has a first plurality of data points, and the first plurality of data points represents the capability of the powertrain components 32A-32D at both the current time (which in this instance is t0), and any desired number of future times (i.e., t1, t2, t3, t4 . . . tY).

The autonomous driving vehicle controller 12 then commands the vehicle 38A to perform the autonomous driving maneuver, such that the vehicle 38A performs the autonomous driving maneuver at step 106. During the maneuver in this example, the portion of the maneuver in the second phase 34B where the vehicle 38A is accelerating, another decision at step 108 is made as to whether the powertrain components 32A-32D have the capability such that the vehicle 38A may complete the autonomous driving maneuver. Although the vehicle 38A accelerates in the second phase 34B as shown, the predictive dynamic limit for vehicle acceleration 46 varies in each of the phases 34A-34E because the capability of the powertrain components 32A-32D at both the current time and future time may change.

There are several possible outcomes at step 108. One outcome is that the powertrain components 32A-32D have the capability such that the vehicle 38A is able to perform the autonomous driving maneuver, shown at step 110. Another outcome is that the autonomous driving maneuver must be aborted completely, shown at step 112. Aborting the autonomous driving maneuver may be a result of failure of one or more of the powertrain components 32A-32D, or failure of some other component in the vehicle 38A.

Yet another outcome of step 108 is that the autonomous driving maneuver and autonomous driving path 36 may be altered, or changed, based on a change in the capability of one or more of the powertrain components 32A-32D. As the capability of the powertrain components 32A-32D changes, the predictive dynamic limit for vehicle acceleration 46 changes, the powertrain controller 14 is then able to communicate the information regarding the capability of the powertrain components 32A-32D to the autonomous driving vehicle controller 12, and change the autonomous driving path 36 according to the change in capability of the powertrain components 32A-32D.

At time t1 in the second phase 34B, the powertrain controller 14 again calculates the predictive dynamic limit for vehicle acceleration 46 based on the capability of the powertrain components 32A-32D, but because the vehicle 38A is accelerating during the second phase 34B in this example, the predictive dynamic limit for vehicle acceleration 46 is limited by the traction drive motoring limits 48, traction drive motor controller limits (not shown), and high voltage battery discharge power limits 52. The predictive dynamic limit for vehicle acceleration 46 is calculated at the current speed of the vehicle 38A (and corresponding speed of the traction drive motor 32A) as well as at a desired future target vehicle acceleration 42A received from the autonomous driving controller 12. Initially, in this example, during the second phase 34B, the predictive dynamic limit for vehicle acceleration 46 is limited by the battery discharge limit 52, and not the traction drive motoring limit 48. The traction drive motoring limit 48 is not at peak, and the battery 32B is approaching the maximum of the battery discharge limit 52.

If the vehicle 38A is unable to perform the autonomous driving maneuver because of a lack of capability of one or more of the powertrain components 32A-32D, in this example at time t1, during the beginning of the second phase 34B, the new target vehicle speed 42 for the future time (i.e., beyond t2), and the predictive dynamic limit for vehicle acceleration 46 is recalculated at step 114 by the autonomous driving controller 12 and the powertrain controller 14. By receiving the new target vehicle speed 42 and acceleration 42A at time t1, the powertrain controller 14 is able to use this information to again predict the capability of the powertrain components 32A-32D at some time in the future (i.e., beyond t1), and therefore predict acceleration capability of the vehicle 38A. The predictive dynamic limit for vehicle acceleration 46 again includes multiple data points, where the time between t1 and tY is broken up incrementally, such that any desired number of data points between t1 and tY may be included. During the second phase 34B, the data points include the new current time t1, and each future time (i.e., t2, t3, t4 . . . tY). Each data point is calculated based on the capability of all of the powertrain components 32A-32D, and in this example, the capability of all of the powertrain components 32A-32D is limited by the traction drive motoring limit 48, the traction drive motor controller limits, and the high voltage battery discharge power limits 52.

As the vehicle 38A accelerates to the new target vehicle speed 42 and acceleration 42A in the second phase 34B such that the vehicle 38A begins to pass the third vehicle 38C, the predictive dynamic limit for vehicle acceleration 46 of the powertrain components 32A-32D is limited by the traction drive motoring limits 48 (i.e., the motor 32A reaches maximum speed) and not the high voltage battery discharge limit 52. The predictive dynamic limit for vehicle acceleration 46 transitions in the third phase 34C at time t3 from being limited by the battery discharge limit 52 to the traction drive motoring limit 48. In this example, this transition occurs because of the changing speed of the vehicle 38A and corresponding adjusted speed of the traction drive motor 32A, as well as the peak to continuous output capability of the motor 32A (i.e., maximum speed of the motor 32A). The torque output of the motor 32A is a function of speed and peak positive torque limit. In the third phase 34C, the current time becomes t3, each future time becomes t4 . . . tY, and the predictive dynamic limit for vehicle acceleration 46 includes new data points at both the current time t3 and each future time (t4 . . . tY).

During the autonomous driving maneuver, steps 106-114 may be repeated as many times as desired to ensure that the vehicle 38A is able to perform the requested autonomous driving maneuver based on the capability of the powertrain components 32A-32D, or the requested autonomous driving maneuver is aborted or modified, as necessary.

Another aspect of performing an autonomous driving maneuver, such as the passing maneuver shown in FIGS. 3-5, is decelerating the vehicle 38A, where the various powertrain components 32A-32D are also used to provide deceleration of the vehicle 38A. At step 116, the powertrain controller 14 calculates a predictive dynamic limit for vehicle deceleration 64 having a second plurality of data points, where the second plurality of data points represents the capability of the powertrain components 32A-32D at both the current time (which during the first phase 34A is t0), and at each future time (i.e., t1, t2, t3, t4 . . . tY) to decelerate the vehicle 38A. In this example, although the vehicle 38A decelerates in the fourth phase 34D, the predictive dynamic limit for vehicle deceleration 64 is shown in each of the phases 34A-34E because the vehicle 38A always has a predictive dynamic limit for vehicle deceleration 64, because the capability of the powertrain components 32A-32D to decelerate the vehicle at both the current and future time may change.

In this example, if the decision made at step 102 is to decelerate the first vehicle 38A after the first vehicle 38A has passed the third vehicle 38C, after the predictive dynamic limit for vehicle deceleration 64 is calculated at step 116, the vehicle 38A attempts to perform the autonomous driving maneuver at step 118.

During the maneuver in this example, the portion of the maneuver in the fourth phase 34D where the vehicle 38A is decelerating, another decision at step 120 is made as to whether the powertrain components 32A-32D have the capability such that the vehicle 38A may complete the autonomous driving maneuver. There are several possible outcomes at step 120. One outcome is that the powertrain components 32A-32D have the capability such that the vehicle 38A is able to perform the autonomous driving maneuver, shown at step 110. Another outcome is that the autonomous driving maneuver must be aborted completely, shown at step 110.

At time t4 in the fourth phase 34D, the powertrain controller 14 again calculates the predictive dynamic limit for vehicle deceleration 64 based on the capability of the powertrain components 32A-32D. During the first phase 34A and second phase 34B, the predictive dynamic limit for vehicle deceleration 64 is determined by the capability of all of the powertrain components 32A-32D, and is limited by the high voltage battery system charging limit 56, which decreases as the battery state of charge 58 increases. As the third phase 34C is initiated and continues to the fourth phase 34D, the predictive dynamic limit for vehicle deceleration 64 is again determined by the capability of all of the powertrain components 32A-32D, but is limited by the traction drive generating limits 60 at the current traction drive motor controller operating point. Because the vehicle 38A is decelerating during the fourth phase 34D in this example, the capability of the powertrain components 32A-32D to decelerate the vehicle 38A is limited by the battery charging limit 56, state of charge 58, traction drive generating limits 60 (both peak and continuous), and vehicle stability regenerative limits 62. Note, even though the high voltage battery charging limits 52 have increased (since the battery 32B has been discharged due to acceleration demand of the vehicle 38A), it is the traction drive generating limit 60 that is limiting the capability of the powertrain components 32A-32D to decelerate the vehicle 38A.

As the capability of the powertrain components 32A-32D changes, the predictive dynamic limit for vehicle deceleration 64 changes, the powertrain controller 14 is then able to communicate the information regarding the capability of the powertrain components 32A-32D to the autonomous driving vehicle controller 12, and also update and change the predictive dynamic limit for vehicle deceleration 64. If the vehicle 38A is unable to perform the autonomous driving maneuver because of a lack of capability of one or more of the powertrain components 32A-32D, in this example at time t4, during the beginning of the fourth phase 34D, the new target vehicle speed 42 for the future time (i.e., beyond t4), and the predictive dynamic limit for vehicle deceleration 64 is recalculated at step 122 by the powertrain controller 14. By receiving the new target vehicle speed 42 and acceleration 42A at time t4, the powertrain controller 14 is able to use this information to again predict the capability of the powertrain components 32A-32D at some time in the future (i.e., beyond t4), and therefore predict deceleration capability of the vehicle 38A.

During the autonomous driving maneuver, steps 106-114 may be repeated as many times as desired to ensure that the vehicle 38A is able to perform the requested autonomous driving maneuver based on the capability of the powertrain components 32A-32D, or the requested autonomous driving maneuver is aborted or modified, as necessary.

As mentioned above, the predictive dynamic limit for vehicle deceleration 64 includes the second plurality of data points, where the time between t0 and tY is again broken up incrementally, such that any desired number of data points between t0 and tY may be included. Again, the current time and future times change as the vehicle 38A performs the autonomous driving maneuver. The predictive dynamic limit for vehicle deceleration 64 may be recalculated as many times as necessary during the fourth phase 34D to ensure that the vehicle 38A is able to perform the requested autonomous driving maneuver based on the capability of the powertrain components 32A-32D.

Once the vehicle 38A reaches the fifth phase 34E, the vehicle 38A has completed the autonomous driving maneuver, and continues on the autonomous driving path 36. During the fifth phase 34E, the vehicle 38A has completed decelerating, and the vehicle 38A resumes travelling at a constant speed, and the target acceleration 42A and the actual achieved acceleration 42B are substantially zero, as shown in FIGS. 3-5.

It should be noted that the battery discharge limit 52 and the battery charge limit 56 refer to the rate at which the battery 32B may be discharged and charged, and are separate parameters from the state of charge of the battery 32B.

The system 10 of the present invention may also include other features that may be incorporated into the prediction of the capability of the various powertrain components 32A-32D during autonomous driving maneuvers. In one embodiment, the vehicle 38A has regenerative braking capability, where the regenerative brakes have regenerative braking limits due to vehicle stability/ESP (Electronic Stability Program). The regenerative braking limits may be included as part of the predictive dynamic limit for vehicle deceleration 64. In another embodiment, thermal management, powertrain operating state (engine on/off) etc. is also be included. These predictive limits of the various powertrain components 32A-32D (which may include the use of regenerative braking, thermal management, powertrain operating state, etc) may be calculated at time t1 for the current time, and at one or more points in time in the future tY, based on the target acceleration/speed trajectory for the path plan of the vehicle 38A provided by the autonomous driving controller 12. This approach for both vehicle acceleration and deceleration capability from the powertrain components 32A-32D is based on current and future energy demand or recuperation. There are different algorithms and variants to this strategy. For example, if the vehicle 38A included additional connectivity which provided static and dynamic data, such as, but not limited to, road grade, vehicle environment, road surface, traffic flow or even traffic timing information, this information may also be included in the limit calculations for predictive powertrain acceleration and deceleration of the vehicle 38A. One example of the implantation of static and dynamic data is the situation where a future road grade is known which would lead to increased thermal management loading for the powertrain components 32A-32D, this additional energy demand requirement would be predicatively accounted for in the calculations for the predictive dynamic limit for vehicle acceleration 46 and the predictive dynamic limit for vehicle deceleration 64 earlier in time.

In addition to the features discussed above, the system 10 having the autonomous driving system powertrain interface of the present invention may also be used to modify the driving path 36 or modify how the autonomous driving maneuver is performed to optimize the efficiency of the vehicle 38A as well. For example, if the vehicle 38A is an electric or hybrid-electric vehicle, the driving path 36 or autonomous driving maneuver may be modified to optimize the efficiency of the traction drive motor 32A, power inverter (not shown), high voltage battery system 32B, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An autonomous driving system powertrain interface, comprising:
    an autonomous driving controller operable for configuring a vehicle to perform at least one autonomous driving maneuver;
    a powertrain controller in electrical communication with the autonomous driving controller;
    at least one powertrain component controlled by the powertrain controller, the powertrain controller operable for calculating the current capability of the at least one powertrain component and the future capability of the at least one powertrain component;
    a current time; and
    at least one future time;
    wherein the autonomous driving controller configures the vehicle to perform the at least one autonomous driving maneuver based on the current capability of the at least one powertrain component at the current time, and the future capability of the at least one powertrain component at the at least one future time, such that the at least one autonomous driving maneuver is altered as the vehicle is performing the at least one autonomous driving maneuver when there is a change in the capability of the at least one powertrain component at the at least one future time.

2. The autonomous driving system powertrain interface of claim 1, further comprising:
    at least one predictive dynamic limit for vehicle acceleration representing the capability of the at least one powertrain component to accelerate the vehicle;
    wherein the autonomous driving controller configures the vehicle to perform the at least one autonomous driving maneuver using the at least one powertrain component based on the at least one predictive dynamic limit for vehicle acceleration.

3. The autonomous driving system powertrain interface of claim 2, the at least one predictive dynamic limit for vehicle acceleration further comprising:
    a first plurality of data points representing the capability of the at least one powertrain component to accelerate the vehicle;
    at least one of the first plurality of data points representing the capability of the at least one powertrain component at the current time; and
    at least one of the first plurality of data points representing the capability of the at least one powertrain component at the at least one future time;
    wherein the autonomous driving controller configures the vehicle to perform the at least one autonomous driving maneuver using the at least one powertrain component based on the first plurality of data points at both the current time and the at least one future time.

4. The autonomous driving system powertrain interface of claim 3, wherein the powertrain controller recalculates the predictive dynamic limit for vehicle acceleration as the vehicle performs the at least one autonomous driving maneuver.

5. The autonomous driving system powertrain interface of claim 1, further comprising:
    at least one dynamic limit for vehicle deceleration representing the capability of the at least one powertrain component to decelerate the vehicle;
    wherein the autonomous driving controller configures the vehicle to perform the at least one autonomous driving maneuver using the at least one powertrain component based on the at least one dynamic limit for vehicle deceleration.

6. The autonomous driving system powertrain interface of claim 5, the at least one dynamic limit for vehicle deceleration further comprising:
    a second plurality of data points representing the capability of the at least one powertrain component to decelerate the vehicle;
    wherein the autonomous driving controller configures the vehicle to perform the at least one autonomous driving maneuver using the at least one powertrain component based on the second plurality of data points at both the current time and the at least one future time.

7. The autonomous driving system powertrain interface of claim 6, wherein the powertrain controller recalculates the predictive dynamic limit for vehicle deceleration as the vehicle performs the at least one autonomous driving maneuver.

8. The autonomous driving system powertrain interface of claim 1, wherein the capability of the at least one powertrain component changes throughout the progression of the at least one autonomous driving maneuver.

9. The autonomous driving system powertrain interface of claim 1, wherein the at least one autonomous driving maneuver is aborted based on the capability of the at least one powertrain component.

10. The autonomous driving system powertrain interface of claim 1, the at least one powertrain component further comprising at least one drive actuator having a traction drive motoring limit and a traction drive generating limit.

11. The autonomous driving system powertrain interface of claim 10, wherein the at least one autonomous driving maneuver is altered based on the traction drive motoring limit and a traction drive generating limit.

12. The autonomous driving system powertrain interface of claim 1, the at least one powertrain component further comprising at least one battery having a maximum charge limit and a maximum discharge limit.

13. The autonomous driving system powertrain interface of claim 12, wherein the at least one autonomous driving maneuver is altered based on the maximum charge limit and the maximum discharge limit.

14. The autonomous driving system powertrain interface of claim 1, wherein the autonomous driving controller alters the at least one autonomous driving maneuver such that the at least one powertrain component is operated in the most efficient manner.

\* \* \* \* \*